United States Patent
Igarashi

(12) 
(10) Patent No.: US 6,473,932 B1
(45) Date of Patent: Nov. 5, 2002

(54) WIPER ARM

(75) Inventor: Yuji Igarashi, Ohta (JP)

(73) Assignee: Mitsuba Corporation, Kiryu (JP)

( * ) Notice: Subject to any disclaimer, the term of this patent is extended or adjusted under 35 U.S.C. 154(b) by 124 days.

(21) Appl. No.: 09/597,486

(22) Filed: Jun. 19, 2000

(30) Foreign Application Priority Data

Jun. 25, 1999 (JP) .......................................... 11-180079

(51) Int. Cl.⁷ ................................................ B60S 1/32
(52) U.S. Cl. ................................................ 15/250.351
(58) Field of Search ................... 15/250.351, 250.352, 15/250.04, 250.32, 250.34, 250.21

(56) References Cited

U.S. PATENT DOCUMENTS

| | | | | | |
|---|---|---|---|---|---|
| 3,042,955 A | * | 7/1962 | Orshei | ................... | 15/250.351 |
| 3,670,354 A | * | 6/1972 | Weber | ................... | 15/250.351 |
| 4,133,071 A | * | 1/1979 | Jaske | ................... | 15/250.351 |
| 4,214,344 A | * | 7/1980 | Kohler et al. | ........... | 15/250.351 |
| 5,724,699 A | * | 3/1998 | Bexten | ................... | 15/250.351 |
| 6,038,728 A | * | 3/2000 | Terai et al. | ............ | 15/250.351 |
| 6,327,739 B1 | * | 12/2001 | Kotlarshi | ............... | 15/250.351 |

FOREIGN PATENT DOCUMENTS

| | | | | | |
|---|---|---|---|---|---|
| EP | 579550 | * | 1/1994 | ............ | 15/250.351 |
| GB | 838419 | * | 6/1960 | ............ | 15/250.352 |
| JP | U-4-34160 | | 3/1992 | | |

* cited by examiner

Primary Examiner—Gary K. Graham
(74) Attorney, Agent, or Firm—Oliff & Berridge, PLC

(57) ABSTRACT

The invention provides greater rigidity in a wiper arm unitarily formed of an arm shank section for connecting to an arm head and an arm piece section for connecting to a wiper blade. An intermediate section is formed between the arm shank section and the arm piece section of the wiper arm, having a bottom surface portion and folded-piece portions which approach the bottom surface portion and oppose each other. While the bottom surface portion is laterally curved, the thickness of the intermediate section facing a window surface is over twice the thickness of a plate material by forming a gap between the bottom surface portion and the folded-piece portions.

12 Claims, 5 Drawing Sheets

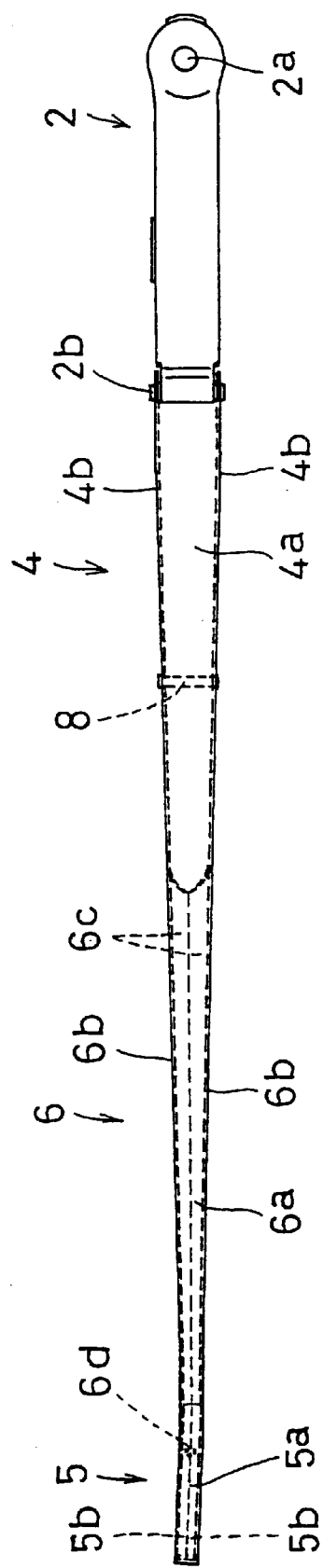
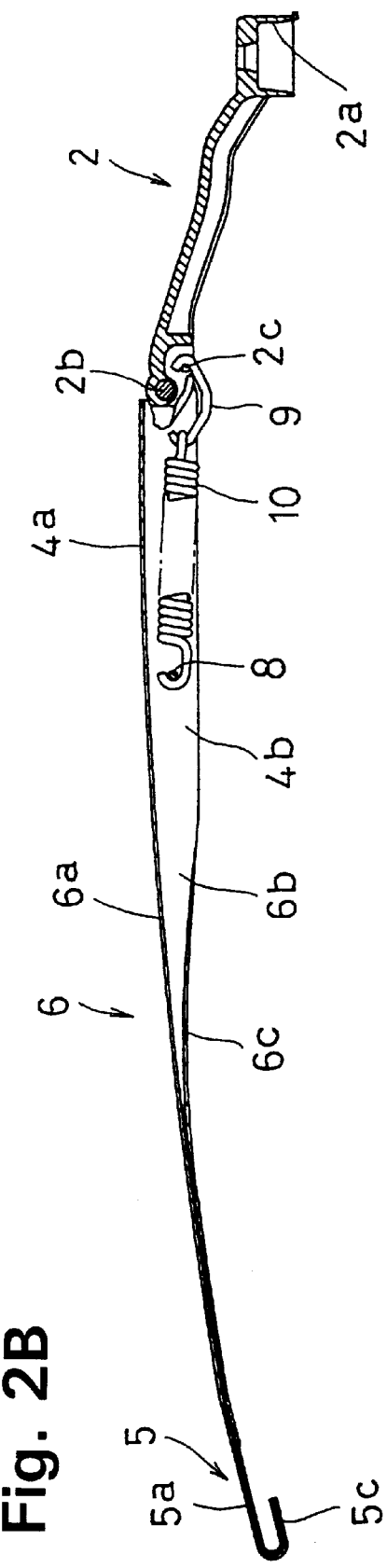
Fig. 2A
Fig. 2B

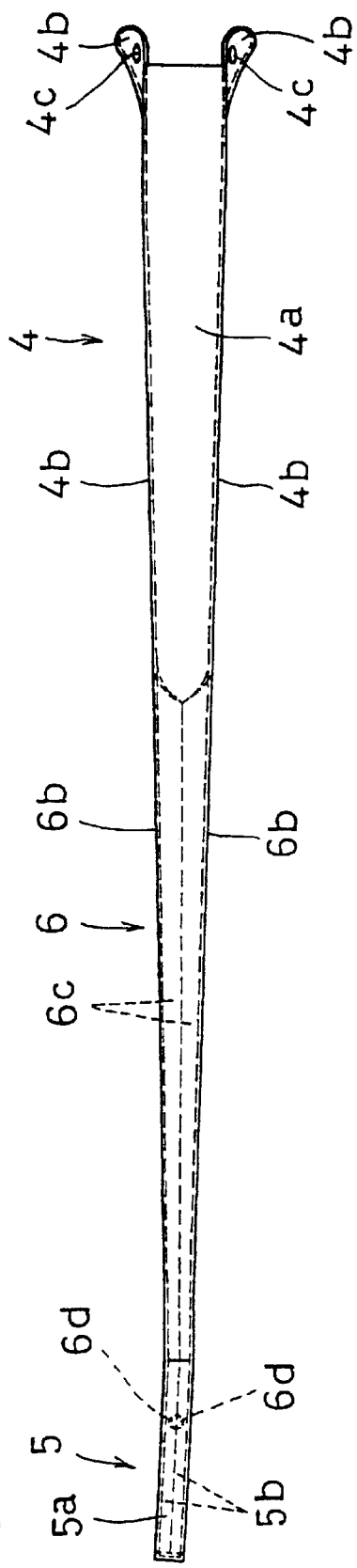
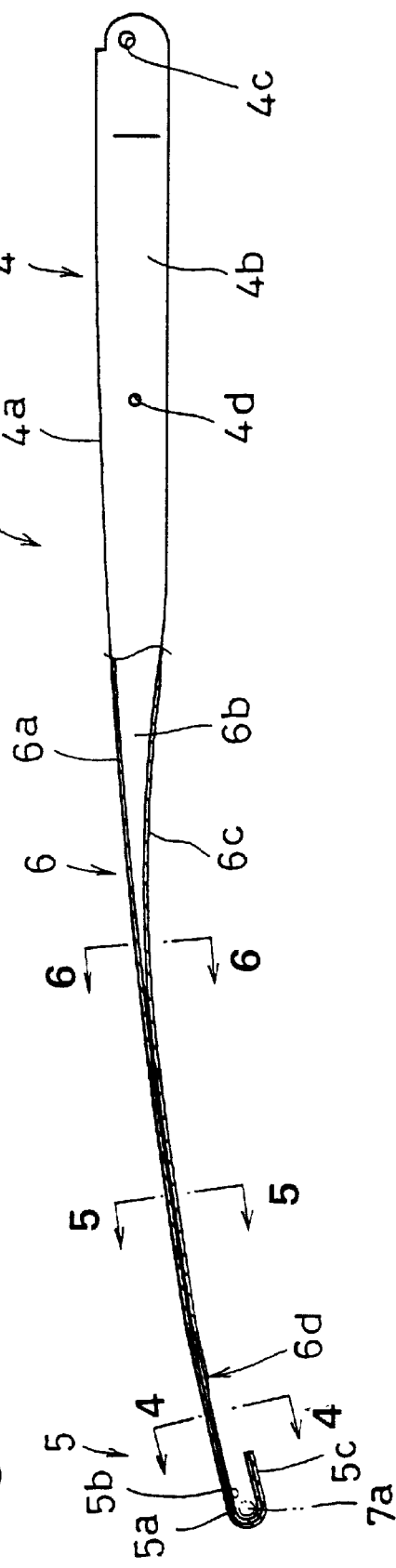
Fig. 3A
Fig. 3B

WIPER ARM

BACKGROUND OF THE INVENTION

1. Field of Invention

The invention relates to a wiper arm of a wiper apparatus for wiping off adherents on a window surface of an automobile or other vehicle.

2. Description of Related Art

Such a wiper arm typically comprises a base portion which is secured to a wiper shaft in an automobile body so as to be connected to an arm head thereto swingably and a top portion of the arm head which holds a wiper blade for wiping a window surface. A conventional wiper arm is formed of an arm shank as the base portion having a substantially H-shaped cross-section and an arm piece as the top portion having a narrow flat-plate shape for affixing the wiper blade, and both parts are separately formed to be connected to each other by securing means, such as by riveting. However, there has been a problem in such a wiper arm in that a difference in level occurs between an arm shank section and an arm piece section thereby not only ruining the design, but also increasing the number of parts, which reduces assembly efficiency. Therefore, unitarily forming the arm shank and the arm piece has been proposed, for example, in JP-U-4-34160.

In this case, the wiper arm is formed by bending a plate-shaped material. That is, side-pieces continuing from both sides of the arm shank are folded to abut the bottom-piece portion so as to form the arm piece having a substantially flat-plate shape.

Also, the wiper arm must have a spring device interposed between the arm shank and the arm head so that the top portion to which the wiper blade is attached is urged toward the window surface. In the above-described example, a plate for receiving the spring device is sandwiched between both side pieces and the bottom piece in the base portion side of the arm piece, and the spring device is attached thereto via the plate, so that the load of the spring device acting on the arm piece is received on the portion reinforced by the plate. However, since a region, in which both side pieces are simply bent (crushed) so as to be folded over to abut the bottom-piece portion in a flat shape is formed between the portion for attaching the wiper blade in the top portion of the arm piece and the portion in which the above-mentioned plate is clamped, the strength of this region is lower than that of the clamping portion of the plate. Therefore, in the region where is not clamped by the plate or a boundary portion between the region and the clamped portion, the wire arm itself is prone to be bent when a large load is exerted on the wiper blade. There is a problem therein to be solved by the invention.

SUMMARY OF THE INVENTION

Accordingly, the invention has been made so as to solve the problem. A wiper arm for affixing a wiper blade thereto for wiping a window surface, the wiper arm comprising a base end portion formed to have a Π-shaped cross-section opening toward the window surface by bending a flat plate; and a top end portion formed by folding back sides of the flat plate continuously from the base end portion, wherein the thickness of the top end portion in a folded state is set to be equal to or more than twice the thickness of the flat plate.

With these features, the rigidity of the wiper arm in the longitudinal direction of the arm is improved.

In a wiper arm according to the invention, the top end portion of the wiper arm is set to be more than twice the thickness of the flat plate by laterally curving a bottom-piece portion of the top end portion opposing the surface.

Furthermore, in a wiper arm according to the invention, the top end portion of the wiper arm is formed to have a thickness more than twice the thickness of the flat plate by forming a gap between the bottom-piece portion of the top end portion and folded-piece portions on both sides.

In a wiper arm according to the invention, preferably, the top end portion of the wiper arm is formed to have a thickness more than twice the thickness of the flat plate by respectively bending folded-piece portions into a cylindrical shape.

Furthermore, in a wiper arm according to the invention, the thickness of the top end portion of the wiper arm is set to be more than twice the thickness of the flat plate, except for a portion for attaching the wiper blade at an extreme end portion of the top end portion.

Still furthermore, in a wiper arm according to the invention, preferably, notch portions for admitting and draining coating liquid are formed at opposing edge portions, opposing each other, of the folded-piece portions.

BRIEF DESCRIPTION OF THE DRAWINGS

FIG. 2A is a plan view of the wiper arm;

FIG. 2B is a sectional side view showing a state in which a wiper arm is connected to an arm head;

FIG. 3A is a plan view of a wiper arm;

FIG. 3B is a partly sectional side view of the wiper arm;

DETAILED DESCRIPTION OF PREFERRED EMBODIMENTS

Figure 1A:
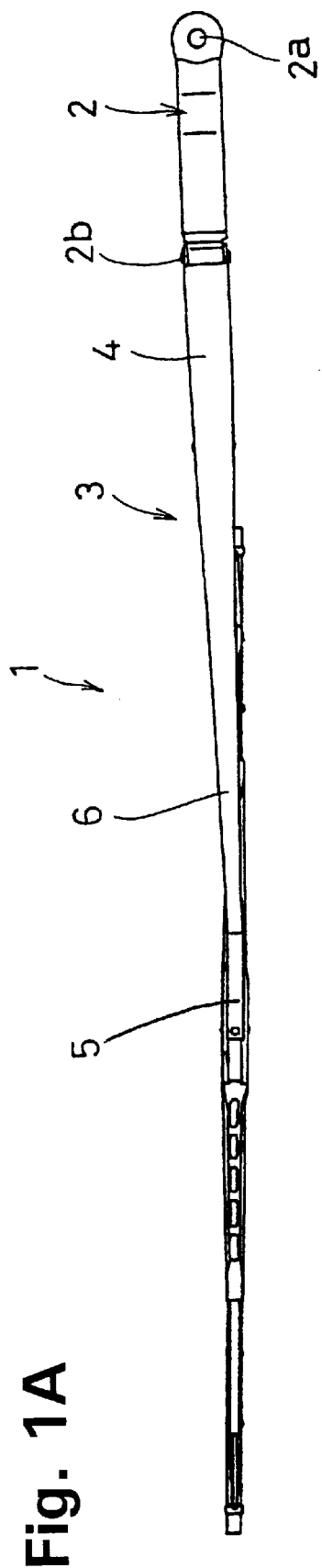
FIG. 1A is a plan view of a wiper arm to which a wiper blade is attached.
Figure 1B:
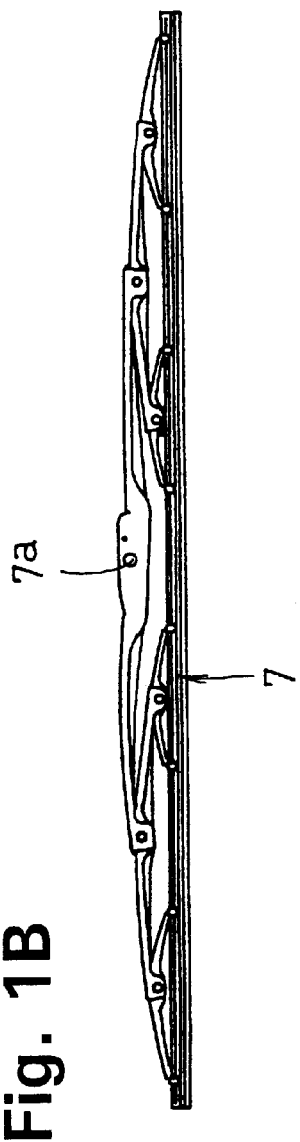
FIG. 1B is a side view of the wiper blade.
Figure 4:
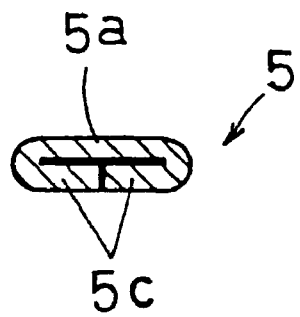
FIGS. 4, 5, and 6 are sectional views at the lines 4—4, 5—5, and 6—6 in FIG. 3B, respectively.
Figure 5:
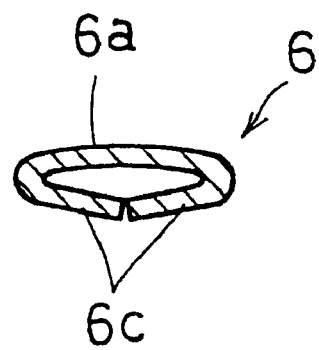
Figure 6:
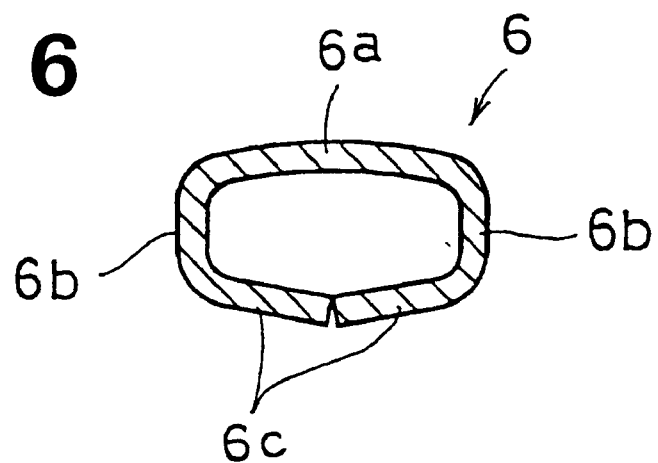

An embodiment of the invention will now be described with reference to FIGS. 1A and 1B, 2A and 2B, 3A and 3B, 4, 5, and 6.

As shown in the drawings, formed in an arm head 2, forming a wiper device 1 to be equipped to a window surface of a vehicle, is a through-hole-type wiper-shaft fitting portion 2a to be unitarily fitted to the top portion of a wiper-shaft (not shown), which is rotatably journaled by bearings in a vehicle body. The through-hole wipershaft fitting portion 2a is formed in a base portion of the arm head 2, while a connecting shaft 2b for attaching a wiper arm 3, which is embodied by the invention, penetrates in the direction orthogonal to the longitudinal direction of the arm, i.e., in the arm lateral direction, and is rotatably journaled by bearings so that the ends thereof protrude outwardly from the sides of the arm head 2.

The wiper arm 3 formed by bending a flat plate material is unitarily formed of an arm shank section 4 for connecting to the top portion of the arm head 2 disposed in the base side of the wiper arm 3 and having a substantially Π-shaped, or inverted U shaped, cross-section, an arm piece section 5 disposed in the top side of the wiper arm 3 and having a substantially flat-plate shape, and an intermediate section 6 disposed between the arm shank section 4 and the arm piece section 5 and having a reinforced structure. A wiper blade 7 is connected to the arm piece section 5 disposed in the top end portion of the wiper arm 3.

The arm shank section 4 is formed to have a substantially II-shaped cross-section, which may also have a substantially C-shaped cross-section, and is open toward the window surface, comprises a bottom surface portion 4a (bottom-piece portion) opposing the window surface and upright-piece portions 4b (equivalent to "both sides" in the invention) for reinforcing the bending strength in the longitudinal direction of the arm of the arm shank section 4 extending toward the window surface from both sides of the bottom surface portion 4a. Through-holes 4c are formed in respective base portions of the upright-piece portions 4b. Both protruding portions of the connecting shaft 2b in the arm head 2 are fitted into the respective through-holes 4c when the arm shank section 4 is applied to the arm head 2 so that the base portion of the bottom surface portion 4a covers the top end portion of the arm head 2. By swaging both ends of the connecting shaft 2b in this state, the arm shank section 4 is rotatably connected to the arm head 2 about the connecting shaft 2b.

In addition, portions for forming the through-holes 4c in the upright-piece portions 4b are respectively formed so as to spread out. By swaging and fixing both ends of the connecting shaft 2b while the upright-piece portions 4b in an outwardly extending state are elastically deformed, the upright-piece portions 4b are set to be connected to the arm head 2 so as to line the sides of the arm head 2.

On the other hand, the arm piece section 5 disposed at the top end of the wiper arm 3 is formed of a bottom surface portion 5a opposing the window surface and folded-piece portions 5b extending from both sides of the bottom surface portion 5a and opposing each other. There is no gap between the bottom surface portion 5a and the folded-piece portions 5b, that is, the folded-piece portions 5b are folded in a crushed state (FIG. 4), so that the thickness of the arm piece section 5 in the direction toward the window surface is set to be approximately twice that of the plate material. Furthermore, the top edge portion of the arm piece section 5 is turned toward the window surface to form a hook piece 5c. The length of the arm piece section 5 in the longitudinal direction of the arm is formed to be approximately twice that of the hook piece 5c. Incidentally, the established length is the required minimal stroke for detachably attaching a mounting portion 7a (mounting pin) of the wiper blade 7 thereto.

Furthermore, the intermediate section 6 is formed so as to comprise a bottom surface portion 6a continuing from the bottom surface portions 4a and 5a of the arm shank section 4 and the arm piece section 5, respectively, intermediate upright-piece portions 6b which are continuous with the upright-piece portions 4b of the arm shank section 4 and taper down toward the top end so as to be creased only at the top end, and folded-back piece portions 6c which extend from both the intermediate upright-piece portions 6b in a folded back state so as to approach and oppose each other and having a predetermined gap relative to the bottom surface portion 6a. The bottom surface portion 6a is formed to be laterally curved while the folded-back piece portions 6c are formed to be continuous with the folded-piece portions 5b of the arm piece section 5. The thickness in the direction toward the window surface of the intermediate section 6 formed by the bottom surface portion 6a and the folded-back piece portions 6c is set to be more than twice the plate thickness (FIGS. 5 and 6) due to the curved bottom surface portion 6a and an opening between the bottom surface portion 6a and the folded back piece portions 6c, so that the rigidity of the intermediate section 6 of the wiper arm 3 in the longitudinal direction of the arm is increased. The wiper arm 3, including the arm shank section 4 and the intermediate section 6, except for the arm piece section 5, is thereby reinforced overall so that improved bending strength in the longitudinal direction of the arm is established.

The wiper arm 3 has a slightly curved shape over the entire length thereof, except for the arm piece 5.

Furthermore, through-holes 4d are bored in both the upright-piece portions 4b at the top end side of the arm shank section 4, and both ends of a laterally oriented pin shaft 8 are fixed to the through-holes 4d by swaging, respectively. On the other hand, a pin shaft 2c is laterally fixed to a position of the arm head 2 in the base end side from a penetrating portion of the connecting shaft 2b and in the window surface side therefrom as well. One end portion of a hook 9 is supported by the pin shaft 2c while the other end portion thereof is retained at one end portion of a spring device 10. By retaining the other end portion of the spring device 10 at the above-mentioned pin shaft 8 of the wiper arm 3, the spring device 10 is arranged so as to urge the top end portion of the wiper arm 3 toward the window surface. Because the spring device 10 in this embodiment is supported by the upright-piece portions 4b of the arm shank section 4 via the pin shaft 8, it is not necessary to bother to provide a reinforcing structure against the load of the spring device 10.

In the folded-back piece portions 6c at the top end portion of the intermediate portion 6, that is, at the boundary portion of the arm piece section 5, semicircular notches 6d are respectively formed to form a circular notch just when these folded-back piece portions 6c are bent and butted together. Thereby, when the wiper arm 3 being bent is painted, pretreatment liquid or liquid paint can be penetrated into and between the bottom surface portion 6a and the folded-back piece portions 6c of the intermediate section 6 through the above-mentioned circular notches 6d, and conversely, excess liquid can be drained therethrough.

In the embodiment of the invention formed as described above, because the wiper arm 3 is unitarily formed of the arm shank section 4, the arm piece section 5, and the intermediate section 6 disposed therebetween, a wiper arm having superior design without differing levels can be achieved. Furthermore, while only the portion for the stroke for attaching the wiper blade 7 is formed, as the arm piece section 5, in a crushed state of the plate having an approximately double plate thickness, other sections in the base end side are reinforced. That is, the arm shank section 4 is reinforced against bending in the longitudinal direction of the arm by forming the upright-piece portions 4b; and while the bottom surface portion 6a is curved, the thickness through the entire section is to be more than twice the plate thickness by forming a gap between the bottom surface portion 6a and the folded-back piece portions 6c to thereby reinforce the intermediate section 6, so that rigidity over substantially the entire length of the wiper arm 3 is increased. Therefore, the bending of the wiper arm 3 due to the load from the wiper blade side, as in a conventional wiper arm in which reinforced portions and unreinforced portions are formed in the longitudinal direction of the arm, can be prevented.

Furthermore, since a gap is formed between the bottom surface portion 6a and the folded-back piece portions 6c, liquid paint for finishing can penetrate therein via the notch hole 6d formed in the end portion toward the arm piece section 5. Consequently, the liquid can be penetrated not only into the gap, but also between the bottom surface portion 5a and the folded-piece portions 5b of the arm piece section 5 at the top end side, enabling rustproofing to be performed.

Figure 7A:
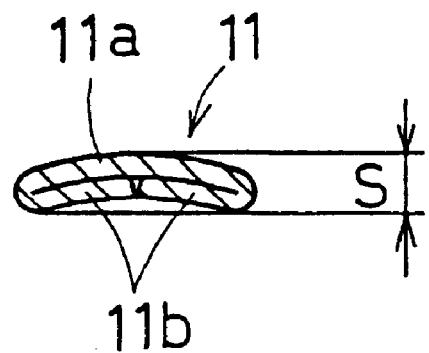
FIGS. 7A, 7B, and 7C are sectional views of an intermediate portion of a wiper arm showing other embodiments, respectively.
Figure 7B:
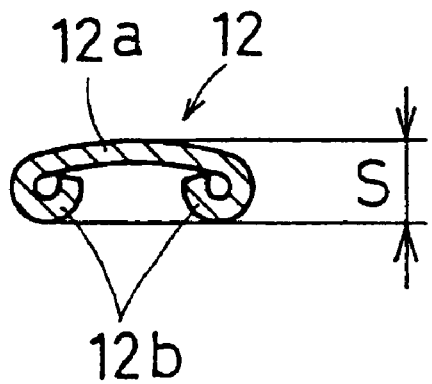
Figure 7C:
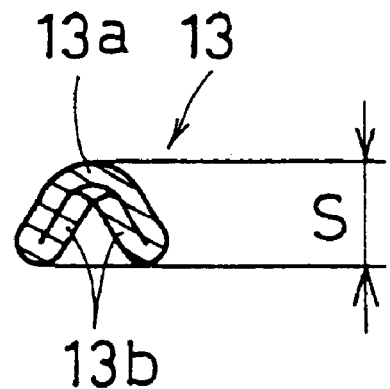

The invention is of course not limited to the above embodiment regarding the sectional shape of the intermediate section. As shown in FIG. 7A, a bottom surface portion 11a of an intermediate section 11 of the wiper arm may be formed in a curved shape, and folded-piece portions 11b may be folded along the curved bottom surface portion 11a, so that the thickness "S" is substantially more than twice that of the plate, increasing the rigidity; as shown in FIG. 7B, while a bottom surface portion 12a of an intermediate section 12 of the wiper arm is formed in a curved shape, folded-piece portions 12b may be bent in cylindrical shapes; and as shown in FIG. 7C, while a bottom surface portion 13a of an intermediate section 13 of the wiper arm is folded back to form a folded angle in the longitudinal direction of the arm, folded-piece portions 13b may be folded along the inclined bottom surface portion 13a. In any case, the thickness "S" is substantially more than twice that of the plate, increasing the rigidity.

What is claimed is:

1. A wiper arm for affixing a wiper blade thereto for wiping a window surface, the wiper arm comprising:
    a base end portion formed to have a substantially inverted U-shaped transverse cross-section opening toward the window surface by bending a flat plate; and
    a top end portion formed by folding back sides of the flat plate continuously from the base end portion, wherein the top end portion in a folded state comprises an intermediate portion having a thickness greater than twice the thickness of the flat plate by respectively bending folded-piece portions into a cylindrical shape and an arm piece portion having a thickness substantially equal to twice the thickness of the flat plate.

2. The wiper arm according to claim 1, wherein forming the intermediate portion of the top end portion of the wiper arm to be more than twice the thickness of the flat plate further includes laterally curving a bottom-piece portion of the top end portion opposing the window surface.

3. The wiper arm according to claim 2, wherein forming the intermediate portion of the top end portion of the wiper arm to have the thickness more than twice the thickness of the flat plate by forming a gap between the bottom-piece portion of the top end portion and the folded-piece portions on both sides.

4. The wiper arm according to claim 1, wherein forming the intermediate portion of the top end portion of the wiper arm to have the thickness more than twice the thickness of the flat plate further includes forming a gap between a bottom-piece portion of the top end portion and the folded-piece portions on both sides.

5. The wiper arm according to claim 1, wherein notch portions for admitting and draining coating liquid are formed at opposing edge portions, opposing each other, of the folded-piece portions.

6. A wiper arm for affixing a wiper blade thereto for wiping a window surface, the wiper arm comprising:
    a base end portion formed to have a substantially inverted U-shaped transverse cross-section opening toward the window surface by bending a flat plate; and
    a top end portion formed by folding back sides of the flat plate continuously from the base end portion, wherein the top end portion in a folded state comprises an intermediate portion having a thickness greater than twice the thickness of the flat plate and an arm piece portion having a thickness substantially equal to twice the thickness of the flat plate, the intermediate portion is formed to have the thickness more than twice the thickness of the flat by laterally curving a bottom-piece portion of the top end portion opposing the window surface and plate by respectively bending folded-piece portions into a cylindrical shape.

7. The wiper arm according to claim 6, wherein notch portions for admitting and draining coating liquid are formed at opposing edge portions, opposing each other, on the folded-piece side of the arm piece portion.

8. A wiper arm for affixing a wiper blade thereto for wiping a window surface, the wiper arm comprising:
    a base end portion formed to have a substantially inverted U-shaped transverse cross-section opening toward the window surface by bending a flat plate; and
    a top end portion formed by folding back sides of the flat plate continuously from the base end portion, wherein the top end portion in a folded state comprises an intermediate portion having a thickness greater than twice the thickness of the flat plate and an arm piece portion having a thickness substantially equal to twice the thickness of the flat plate, the intermediate portion formed to have the thickness more than twice the thickness of the flat plate by forming a gap between the bottom-piece portion of the top end portion and folded-piece portions on both sides and by respectively bending the folded-piece portions into a cylindrical shape.

9. The wiper arm according to claim 8, wherein notch portions for admitting and draining coating liquid are formed at opposing edge portions, opposing each other, on the folded-piece side of the arm piece portion.

10. A wiper arm for affixing a wiper blade thereto for wiping a window surface, the wiper arm comprising:
    a base end portion formed to have a substantially inverted U-shaped transverse cross-section opening toward the window surface by bending a flat plate; and
    a top end portion formed by folding back sides of the flat plate continuously from the base end portion, wherein the top end portion in a folded state comprises an intermediate portion having a thickness greater than twice the thickness of the flat plate and an arm piece portion having a thickness substantially equal to twice the thickness of the flat plate by laterally curving a bottom-piece portion of the top end portion opposing the window surface, the intermediate portion formed to have the thickness more than twice the thickness of the flat plate by forming a gap between the bottom-piece portion of the top end portion and folded-piece portions on both sides and by respectively bending the folded-piece portions into a cylindrical shape.

11. The wiper arm according to claim 10, wherein notch portions for admitting and draining coating liquid are formed at opposing edge portions, opposing each other, of the folded-piece portions.

12. A wiper arm for affixing a wiper blade thereto for wiping a window surface, the wiper arm comprising:
    a base end portion formed to have a substantially inverted U-shaped transverse cross-section opening toward the window surface by bending a flat plate; and
    a top end portion formed by folding back sides of the flat plate continuously from the base end portion, wherein the top end portion in a folded state comprises an intermediate portion having a curved central surface with the sides folded back in a cylindrical shape and a thickness greater than twice the thickness of the flat plate and an arm piece portion having a thickness substantially equal to twice the thickness of the flat plate.

* * * * *